(12) United States Patent
McFarlane et al.

(10) Patent No.: US 8,882,131 B2
(45) Date of Patent: Nov. 11, 2014

(54) DOUBLE ARTICULATED HAULAGE TRUCK

(75) Inventors: Scott McFarlane, Corinda (AU); James W. Cooper, Sherwood (AU)

(73) Assignee: Power Patent Pty Ltd., Sherwood (AU)

( * ) Notice: Subject to any disclaimer, the term of this patent is extended or adjusted under 35 U.S.C. 154(b) by 0 days.

(21) Appl. No.: 13/576,710

(22) PCT Filed: Apr. 13, 2011

(86) PCT No.: PCT/AU2011/000419
§ 371 (c)(1),
(2), (4) Date: Jan. 17, 2013

(87) PCT Pub. No.: WO2011/127526
PCT Pub. Date: Oct. 20, 2011

(65) Prior Publication Data
US 2013/0126256 A1    May 23, 2013

(30) Foreign Application Priority Data
Apr. 13, 2010    (AU) ................................ 2010901555

(51) Int. Cl.
| | | |
|---|---|---|
| *B62D 53/04* | (2006.01) | |
| *B62D 53/08* | (2006.01) | |
| *B62D 33/06* | (2006.01) | |
| *E21F 13/00* | (2006.01) | |
| *B62D 53/02* | (2006.01) | |

(52) U.S. Cl.
CPC ............... *E21F 13/00* (2013.01); *B62D 53/08* (2013.01); *B62D 53/04* (2013.01); *B62D 33/06* (2013.01); *B62D 53/02* (2013.01)
USPC ...................................... 280/411.1; 180/245

(58) Field of Classification Search
USPC ............... 180/245, 235; 280/400, 403, 411.1, 280/426; 56/14.6
See application file for complete search history.

(56) References Cited

U.S. PATENT DOCUMENTS

| | | | | |
|---|---|---|---|---|
| 3,146,487 | A | * | 9/1964 | Nelson et al. ................... 16/337 |
| 3,390,735 | A | | 7/1968 | Medley et al. |
| 3,430,985 | A | * | 3/1969 | Hildebrandt et al. ......... 280/426 |
| 3,511,398 | A | * | 5/1970 | Lyster et al. ................... 414/460 |
| 3,721,358 | A | * | 3/1973 | Brock ............................ 414/460 |
| 4,022,342 | A | * | 5/1977 | Brock ............................ 414/459 |
| 4,570,965 | A | * | 2/1986 | Caswell ........................ 280/426 |
| 4,586,578 | A | * | 5/1986 | Brown et al. ................. 180/14.4 |
| 4,943,078 | A | * | 7/1990 | McGhie et al. ............... 280/408 |
| 5,202,836 | A | * | 4/1993 | Iida et al. ...................... 700/101 |

FOREIGN PATENT DOCUMENTS

GB             885031        12/1961

* cited by examiner

*Primary Examiner* — Tony Winner
(74) *Attorney, Agent, or Firm* — Oliff PLC

(57) ABSTRACT

A double articulated truck has a front vehicle module with a drive engine and having at least one wheeled axle driven by the drive engine through a transmission and having a load-bearing bin, the front vehicle module being interconnected in an articulated manner about a first vertical pin to the front of the load-bearing bin. A rear vehicle module is interconnected in an articulated manner about a second vertical pin to the rear of the load-bearing bin, the rear vehicle module having at least one wheeled axle whereby the bin is supported by the front and rear vehicle modules. The rear module only articulates about the second vertical pin when the articulation of the front module to the bin exceeds 30 degrees and then in a synchronous manner. Typically the maximum articulation of the front module is around 42 degrees and the rear module some 13 degrees.

12 Claims, 2 Drawing Sheets

DOUBLE ARTICULATED HAULAGE TRUCK

This application is a U.S. National-Stage entry under 35 U.S.C. 371 based on International Application No. PCT/AU2011/000419, filed Apr. 13, 2011, which was published under PCT Article 21(2) and which claims priority to Australian Application No. 2010901555, filed Apr. 13, 2010, the entirety of which in incorporated by reference.

FIELD OF THE INVENTION

The present invention relates to a double articulated hauler or truck, such as a dumper. The truck includes a front module having a drive engine, a load-bearing bin and a rear module. The front module and the rear module are interconnected to the load-bearing bin in an articulated manner each about a vertical pin.

BACKGROUND OF THE INVENTION

It is previously known to provide an articulated truck such as a dumper having a front vehicle module pivotally connected about a vertical pin to a rear vehicle module, usually a load bearing bin supported by several axles where the rear vehicle module axles are arranged at a distance from the vertical pin, and the front vehicle module has a front wheel axle arranged at a considerably shorter distance from the vertical pin.

This arrangement allows such trucks to have smaller turning radii then those that have a steered axle, for the same length vehicle. As such they are particularly useful in situations such as in underground mines and are the preferred vehicle for hauling ore in underground mines where the tunnels may be quite tight. Typically tunnels have a 5.5 meter cross-sectional size and 6 meter square cut corners (90 degrees).

Typical underground articulated trucks have a front module housing an engine that drives wheels both in the front module and the bin so as to provide the greatest traction. Yet to provide power to both the front module and the bin requires complex drivelines. In addition the speed and weight carrying ability of an underground articulated truck is always related to the power of the engine. Thus there is generally an upper limit to the capacity that an articulated underground truck can deliver in terms of speed, weight and grade of the road.

OBJECT OF THE INVENTION

It is an object of the current invention to overcome the above mentioned problems or at least provide the public with a useful alternative.

It is a further object of the present invention to provide for a double articulated haulage truck that improves upon the power and/or speed of current underground articulated trucks.

It is a still further object of the invention to provide for an articulated underground haulage trucks that obviate the need to a drop box.

SUMMARY OF THE INVENTION

In one form of the invention there is proposed a double articulated truck including:
a front vehicle module housing a drive engine and having at least one wheeled axle driven by the drive engine through a transmission;
a load-bearing bin, the front vehicle module being interconnected in an articulated manner about a first vertical pin to the front of the load-bearing bin;
a rear vehicle module being interconnected in an articulated manner about a second vertical pin to the rear of the load-bearing bin, the rear vehicle module having at least one wheeled axle whereby the bin is supported by the front and rear vehicle modules.

In preference the rear vehicle module includes a second drive engine driving the wheel axle of the rear vehicle module.

In preference the ratio of the articulation of the rear vehicle to the front vehicle is less then 100%.

In preference the ratio of the articulation of the rear module to the front module is around 30%.

In preference the maximum articulation angle of the rear vehicle module is 13 degrees.

In preference the rear module articulates around the second vertical pin only when the front module has articulated 30 degrees or more about the first vertical pin.

In preference the load-bearing bin is adapted to tip sideways.

In preference the wheels are driven hydraulically.

BRIEF DESCRIPTION OF THE DRAWINGS

The accompanying drawings, which are incorporated in and constitute a module of this specification, illustrate several implementations of the invention and, together with the description, serve to explain the advantages and principles of the invention. In the drawings.

LIST OF COMPONENTS

Figure 1:
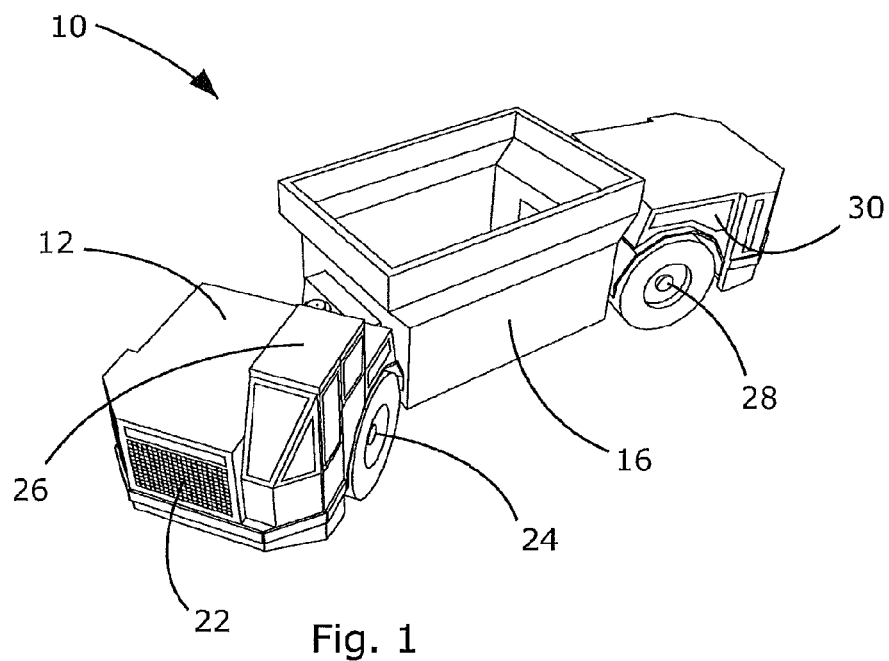
FIG. 1 is a schematic perspective view of an underground haulage truck embodying the present invention when cornering.
Figure 2:
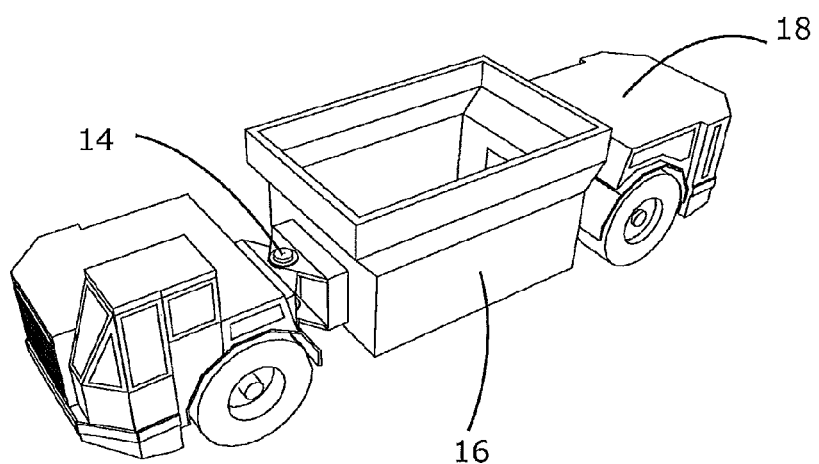
FIG. 2 is a schematic perspective view of an underground haulage truck embodying the present invention when travelling in a straight direction.

10 truck
12 front module
14 first or front vertical pin
16 bin
18 rear module
20 second or rear vertical pin
22 front module engine
24 front wheel axle
26 driver cabin
28 rear wheel axle
30 rear module engine
32 corner
34 inner radii of swept path
36 outer radii of swept path

DESCRIPTION OF THE PREFERRED EMBODIMENTS

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like modules, Dimensions of certain of the modules shown in the drawings may have been modified and/or exaggerated for the purposes of clarity or illustration.

Turning now to the drawings in detail there is shown an underground haulage truck 10 embodying the present invention and including a front module 12 pivotably connected by a first or front vertical pin 14 to the front of a bin 16. A rear module 18 is also pivotably connected by second or rear vertical pin 20 to the rear of the bin 16. The articulation is a standard engineering principle and it is not intended to discuss that in any detail. It is however important to note that there are many engineering solutions and it is not intended to limit the articulation to any particular style.

The front module includes an engine 22 and at least one wheeled axle 24 that is driven by engine 22 through an appropriate transmission. Front module 22 also includes a cabin 26 that houses the driver that controls the truck. The rear module 18 also includes a wheeled axle 28 so that the front axle 24 and rear axle 28 support the bin 16. Bin 16 is typically adapted to be a side tip bin able to carry a 60 ton capacity.

Illustrated in the drawings is a rear module 18 that also includes an engine 30 that drives rear axle 28. This enables the load bearing capacity of the bin 16 to be increased, Of course it is to be understood that it is not the intention of the invention to limit it to both the front and rear modules having engines—it is rather a preferred feature. Thus the front engine could provide hydraulic power to rear axle 28 through well known means. Alternatively the engine may be on the rear module and hydraulic power provided to the front axle 24.

Figure 3:
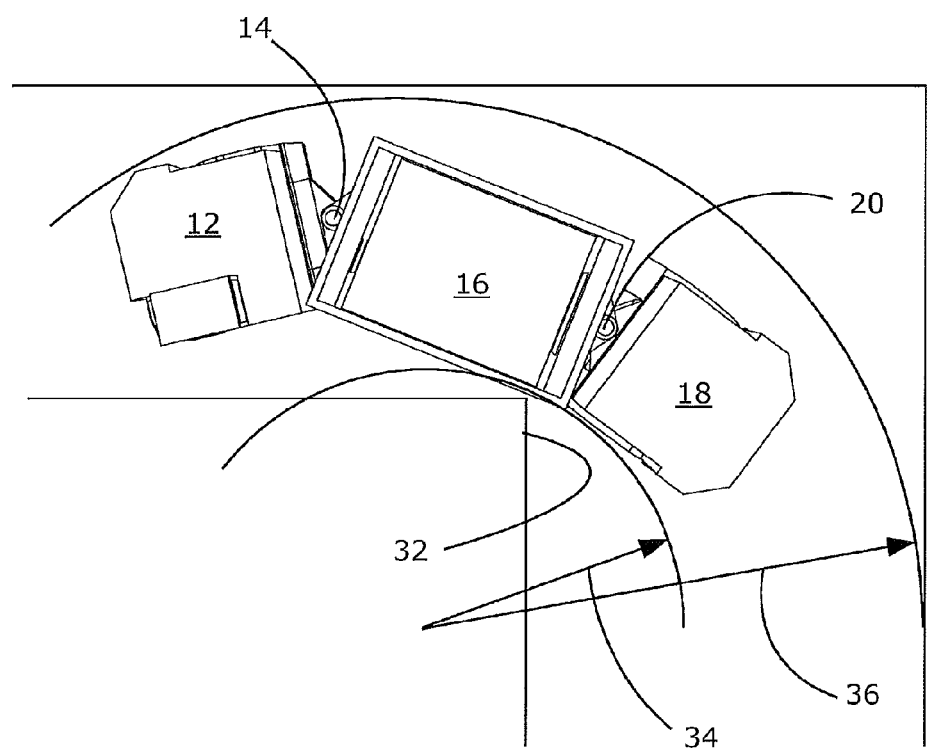
FIG. 3 illustrates in a top view the swept path of an underground haulage truck embodying the present invention.

In a preferred operation the rear module is adapted to articulate at a 30% ratio of the front articulation angle to a maximum of 13 degrees. This results in minimising the swept path as illustrated in FIG. 3 whilst maintaining a longer vehicle of around 13.8 meters length, longer then other trucks currently used.

The addition of the engine in the rear module provides extra motive power to the truck resulting in being able to carry a heavier payload at the same or even greater speeds then current trucks. It is envisaged that both engines will be in the 500-600 hp category using proven engines and transmissions such as the QSX15 Cummins engine at 550 hp and the Allison 4000 series transmissions. Being double articulated means that no steered axles are required, using, for example, the Kessler D111 axle, providing a simple system, avoiding the need for drop boxes and providing an all wheel drive to the truck.

To accommodate most underground tunnels the preferred maximum angle of the steer may be around 42.5 degrees and the rear steer remains straight until a predetermined front steer occurs. In a preferred embodiment this occurs when the front steer reaches around 30 degrees. Beyond this angle the front and rear steers are synchronised on a 1:1 ratio so that when the front steers around 40 degrees the rear steers around 10 degrees. However it is to be understood that the present invention is not to be limited to those features.

In the preferred embodiment the rear steer can not be disengaged from the front. However there may be situations where this may be a desirable feature.

In order to maintain stability the vehicle as described above would be speed limited to around 30 km/h.

The reader will now appreciate the present invention and its preferred embodiments. The double articulation allows a longer vehicle to be accommodated within the same swept path as other trucks that are shorter in length as is illustrated in FIG. 3 where the vehicle is negotiating a corner 32 and the inner and outer radii 34 and 36 of the swept path are approximately 5.3 and 9.5 meters. The longer vehicle thus accommodates a larger load space thus bigger payload.

Although the dimensions of the vehicle may vary the typical dimensions are as follows:

Distance between the front axle and front vertical pin around 2000 mm;

Distance between the front and the rear vertical pins some 4500 mm;

Distance between the rear vertical pin and the rear axle some 1150 mm.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A double articulated truck including:
    a steerable front vehicle module housing a drive engine and having at least one wheeled axle driven by the drive engine through a transmission;
    a load-bearing bin, the steerable front vehicle module being interconnected in an articulated manner about a first vertical pin to a front of the load-bearing bin;
    a rear vehicle module being interconnected in an articulated manner about a second vertical pin to a rear of the load-bearing bin, the rear vehicle module having at least one wheeled axle whereby the bin is supported by the front and rear vehicle modules,
    where the rear vehicle module articulates around the second vertical pin only when the steerable front vehicle module has articulated 30 degrees or more about the first vertical pin.

2. A double articulated truck as in claim 1 where the rear vehicle module includes a second drive engine driving the wheel axle of the rear vehicle module.

3. A double articulated truck as in claim 1 where the ratio of the articulation of the rear vehicle module to the steerable front vehicle module is less than 100%.

4. A double articulated truck as in claim 3 wherein the ratio of the articulation of the rear vehicle module to the steerable front vehicle module is around 30%.

5. A double articulated truck as in claim 1 where the maximum articulation angle of the rear vehicle module is 13 degrees.

6. A double articulated truck as in claim 1, wherein the rear vehicle module is interconnected in an articulated manner so that the rear vehicle module is articulated in a plurality of directions while in motion.

7. A double articulated truck as in claim 1 wherein the rear module articulates in synchronization with the steerable front vehicle module after the steerable front vehicle has articulated more than 30 degrees.

8. A double articulated truck as in claim 1 wherein the load-bearing bin is adapted to tip sideways.

9. A double articulated truck as in claim 1 wherein the wheels are driven hydraulically.

10. A double articulated truck as in claim 1, wherein the rear vehicle module is interconnected in an articulated manner about a second vertical pin to the rear of the load-bearing bin so that the rear module articulates relative to the load-bearing bin in response to the front module being articulately steered through an angle with the load-bearing bin.

11. A double articulated truck including:
- a steerable front vehicle module housing a drive engine and having at least one wheeled axle driven by the drive engine through a transmission;
- a load-bearing bin, the steerable front vehicle module being interconnected in an articulated manner about a first vertical pin to the front of the load-bearing bin;
- a rear vehicle module being interconnected in an articulated manner about a second vertical pin to the rear of the load-bearing bin, the rear vehicle module having at least one wheeled axle whereby the bin is supported by the front and rear vehicle modules,
- where the maximum articulation angle of the rear vehicle module is 13 degrees.

12. A double articulated truck including:
- a steerable front vehicle module housing a drive engine and having at least one wheeled axle driven by the drive engine through a transmission;
- a load-bearing bin, the steerable front vehicle module being interconnected in an articulated manner about a first vertical pin to the front of the load-bearing bin;
- a rear vehicle module being interconnected in an articulated manner about a second vertical pin to the rear of the load-bearing bin, the rear vehicle module having at least one wheeled axle whereby the bin is supported by the front and rear vehicle modules,
- where the ratio of the articulation of the rear vehicle module to the steerable front vehicle module is around 30%.

* * * * *

UNITED STATES PATENT AND TRADEMARK OFFICE
CERTIFICATE OF CORRECTION

| | | |
|---|---|---|
| PATENT NO. | : 8,882,131 B2 | Page 1 of 1 |
| APPLICATION NO. | : 13/576710 | |
| DATED | : November 11, 2014 | |
| INVENTOR(S) | : McFarlane et al. | |

It is certified that error appears in the above-identified patent and that said Letters Patent is hereby corrected as shown below:

On the Title Page:

In the Assignee line, item (73), delete "Power Patent Pty Ltd." and insert --Power Patents Pty Ltd.--, therefor.

Signed and Sealed this
Seventeenth Day of March, 2015

Michelle K. Lee
*Director of the United States Patent and Trademark Office*